United States Patent
Patten et al.

(10) Patent No.: US 7,614,273 B2
(45) Date of Patent: Nov. 10, 2009

(54) METHOD FOR DETECTING CORROSION, EROSION OR PRODUCT BUILDUP ON VIBRATING ELEMENT DENSITOMETERS AND CORIOLIS FLOWMETERS AND CALIBRATION VALIDATION

(75) Inventors: Andrew Timothy Patten, Boulder, CO (US); Graeme Ralph Duffill, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 10/570,941

(22) PCT Filed: Sep. 29, 2003

(86) PCT No.: PCT/US03/30661

§ 371 (c)(1),
(2), (4) Date: Mar. 8, 2006

(87) PCT Pub. No.: WO2005/040733

PCT Pub. Date: May 6, 2005

(65) Prior Publication Data

US 2007/0028663 A1 Feb. 8, 2007

(51) Int. Cl.
  *G01F 25/00* (2006.01)
(52) U.S. Cl. ......................................................... 73/1.16
(58) Field of Classification Search ........................ None
  See application file for complete search history.

(56) References Cited

U.S. PATENT DOCUMENTS 4,872,351 A   10/1989  Ruesch 5,687,100 A * 11/1997 Buttler et al. ............... 702/137
6,092,409 A    7/2000  Patten et al.
6,651,513 B2  11/2003  Wenger et al.
2002/0189323 A1 12/2002 Francisco, Jr.

FOREIGN PATENT DOCUMENTS

| DE | 10020606 A1 | 10/2001 |
| EP | 0816807 A2 | 1/1998 |
| WO | WO01/67052 A1 | 9/2001 |

\* cited by examiner

Primary Examiner—Robert R Raevis
(74) Attorney, Agent, or Firm—The Ollila Law Group LLC

(57) ABSTRACT

A method and apparatus for validating the flow calibration factor of a Coriolis flowmeter. In accordance with a first embodiment, an improved material density is obtained by measuring material density when the temperature of the material is equal to a predetermined reference temperature. In accordance with a second embodiment, a preprogrammed data base stores density/temperature relationships. Improved density information is obtained by measuring the density and temperature of the material, applying the measured density/temperature information from the data base, and obtaining density information compensated for a predetermined reference temperature. The improved density information obtained for both embodiments is unaffected by temperature changes and is used to validate the flow calibration factor. The flow calibration factor compensation for pressure changes and changes in material composition is obtained in a similar manner.

42 Claims, 8 Drawing Sheets

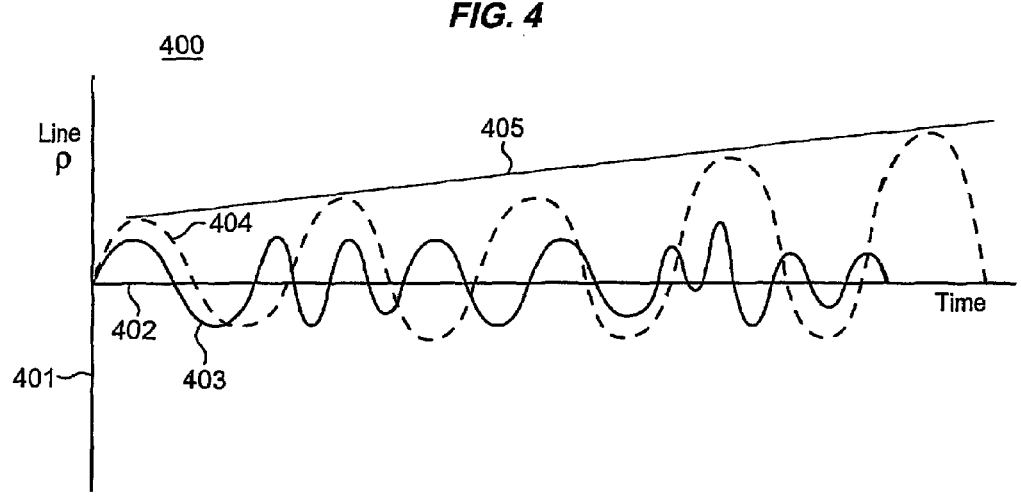
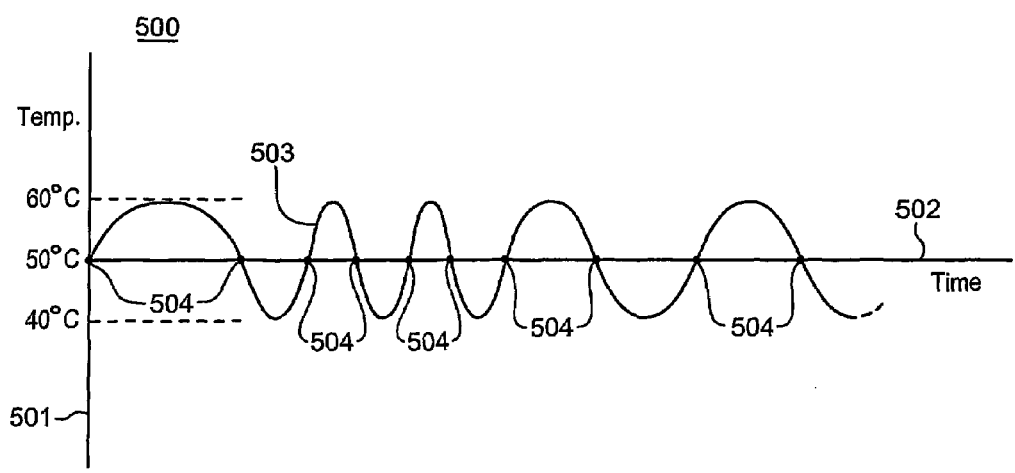

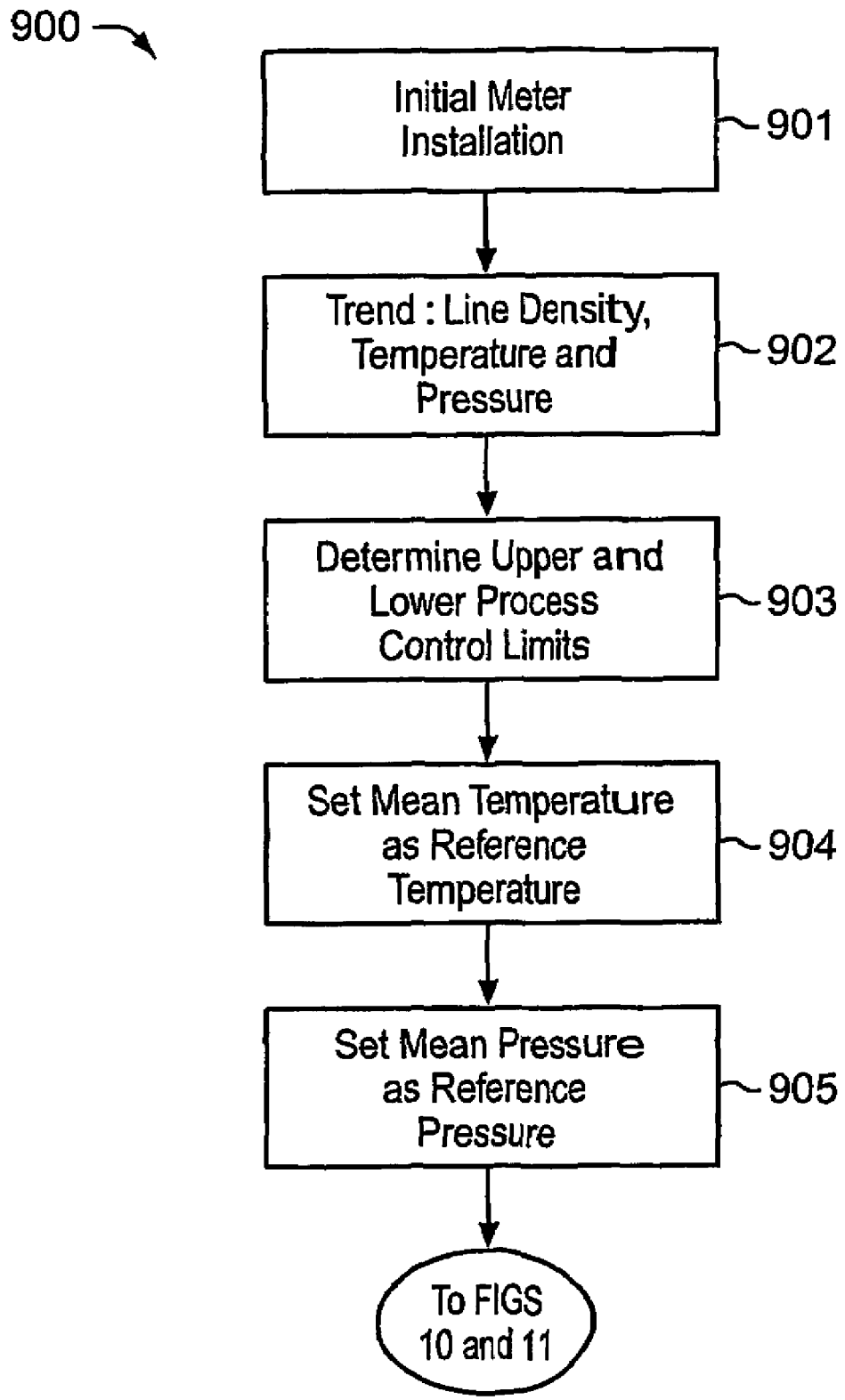

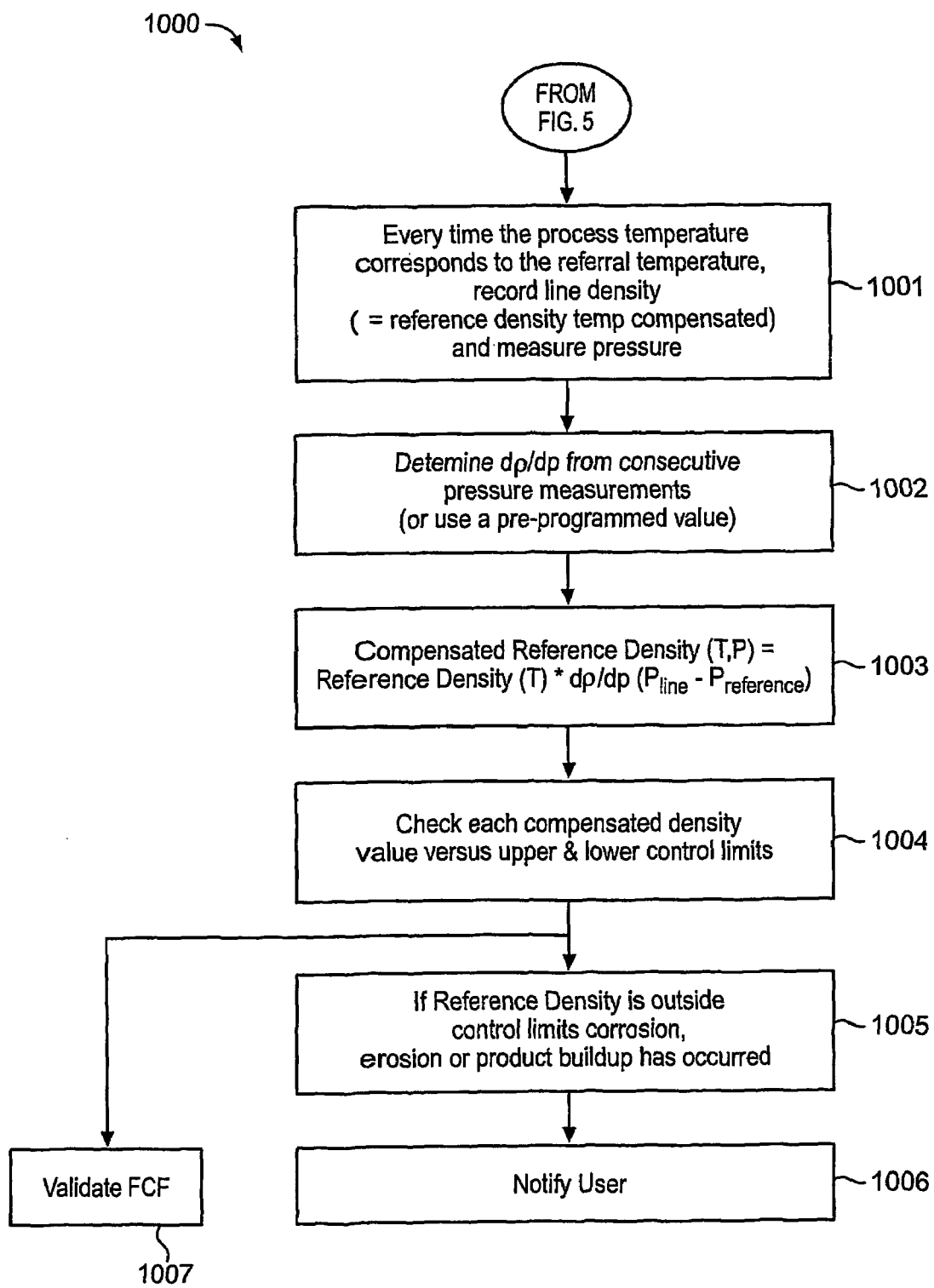

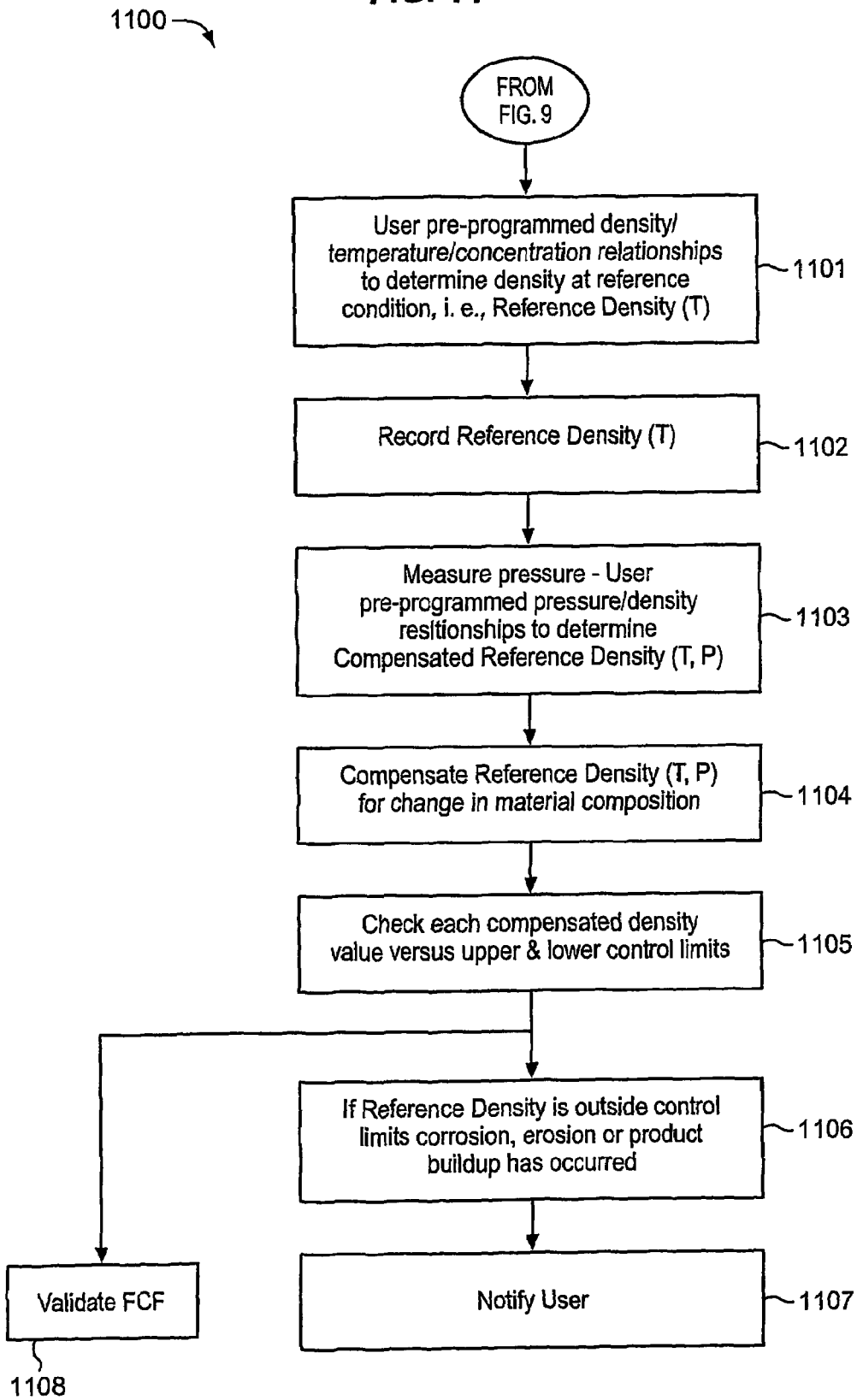

METHOD FOR DETECTING CORROSION, EROSION OR PRODUCT BUILDUP ON VIBRATING ELEMENT DENSITOMETERS AND CORIOLIS FLOWMETERS AND CALIBRATION VALIDATION

FIELD OF THE INVENTION

The invention relates to a system for validating a calibration of a Coriolis flowmeter. More particularly, this invention relates to using a density measurement to determine whether the calibration of a Coriolis flowmeter remains substantially constant or drifts with time. Still more particularly, this invention relates to increasing the accuracy of the density measurement to more accurately validate the flow calibration factor of a Coriolis flowmeter.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Pick off sensors are placed at two different points on the flow tube to produce sinusoidal signals representative of the motion of the flow tube at the two points. A phase difference of the two signals received from the pick off sensors is calculated in units of time.

The phase difference between the two pick off sensor signals is proportional to the mass flow rate of the material flowing through the flow tube or flow tubes. The mass flow rate of the material is determined by multiplying the phase difference by a flow calibration factor. Prior to installation of the flowmeter into a pipeline, the flow calibration factor is determined by a calibration process. In the calibration process, a fluid is passed through the flow tube at a given flow rate and the relationship (flow calibration factor) between the phase difference and the flow rate is calculated.

The Coriolis flowmeter determines flow rate by multiplying the flow calibration factor by the phase difference of the two pickoff signals. The flow calibration factor is proportional to the material and cross sectional properties of the flow tube. A change in the material and cross sectional properties of the flow tube can change the flow calibration factor of the flowmeter. If the flow calibration factor of the flowmeter changes, flow rates that are calculated using the original flow calibration factor are less accurate.

The flow calibration factor hereinafter FCF is in itself dependent upon other parameters of the Coriolis flowmeter. The expression for the flow calibration factor is $FCF=G_1*E_o*I_o$ where $G_1$ is a geometric constant of the flow tubes, $E_0$ is Young's modulus of elasticity and $I_0$ is the moment of inertia of the flow tube. Thus, the determination of an accurate FCF depends upon an accurate determination of constant $G_1$, Young's modulus, and the moment of inertia of the flow tube. Geometric constant $G_1$ and Young's modulus are relatively stable values and do not change. However, the term $I_o$ is subject to change since it is dependent upon other flow tube parameters which in themselves can change.

Changes in the material and cross sectional properties of the flow tube can change the moment of inertia the flow tube. One example of the change in cross-sectional properties of the flow tube is the change caused by corrosion of the flow tube. A second example of a change in the material and cross-sectional properties of the flow tube is coating of the flow tube by materials flowing through the tube.

U.S. Pat. No. 6,092,409 of 25 Jul. 2000 describes a process for validating the flow calibration factor of a Coriolis flowmeter by comparing the measured density of known fluid to the known density. A deviation from the expected density can represent possible error conditions in the flow tube such as material corrosion or erosion.

However, it is a problem to accurately measure density or implement measurement conditions to facilitate accurate density measurement. Material density can be subject to significant change with temperature. Density can also change to a lesser extent with changes in other parameters such as material pressure and material composition. Therefore, there is a need in the art for a system that more accurately detects a possible change in the material or cross sectional properties of a flow tube indicating the mass flow rates measured by the Coriolis flowmeter may be inaccurate.

SOLUTION

The above and other problems are solved and an advance in the art is achieved through the provision of a system for validating the flow calibration factor of a Coriolis flowmeter.

A Coriolis flowmeter has pick off sensors on the flow tube that are connected to meter electronics. Signals from the pick off sensors are received by the meter electronics and are converted to machine-readable or digital signals. The digital signals are used as data for applications performed by a processor in the meter electronics to determine certain properties, such as mass flow rate and density, of the material flowing through the flow tube. The instructions for these applications are stored in a memory connected to the processor. The present invention relates an application performed by the processor that validates the flow calibration factor of the Coriolis flow meter. The validation application measures a period of oscillation of the flow tube as a material, such as the process fluid, having a prior characterized density flows through the flow tube. The measured period of oscillation is then used to detect possible error conditions in the flow tube using derivations of an equation for determining the density of a material from a period of oscillation of the flow tube.

As mentioned, the flow calibration factor FCF requires reliable density information so that the flow calibration factor may be of sufficient precision to facilitate the generation of reliable flow information by the Coriolis flowmeter. However, obtaining reliable density information is often difficult since density changes significantly with changes in other Coriolis flowmeter parameters with the biggest such parameter being the temperature of the process material. Temperature changes are common place and therefore a process which, without more, merely measures density as temperature changes may provide a flow calibration factor validation of inadequate precision for satisfactory operation of the Coriolis flowmeter.

The present invention provides method and apparatus for measuring density by a process that overcomes the unavoidable variations in temperature. In accordance with a first possible exemplary embodiment of the invention, the temperature changes are overcome by a process that defines a reference temperature that is to be used for the density determination. The temperature of the process material is then monitored for changes, and a density measurement is made when the temperature of the process material equals the preselected reference temperature. At that time, a density measurement is made and recorded. The temperature of the process material may continue to change with time, but the density is again determined each time the temperature changes and becomes equal to the reference temperature. In this manner, a series of density measurements are obtained and recorded to provide a sequence of temperature compensated density measurements. By this process, the density readings supplied to the data processing facilities of the meter electronics is of a substantially constant value that is free from errors caused by the measurement of density of the process material at varying temperatures of the process material. This process therefore minimizes errors in the density information caused by the unavoidable changes in the process material resulting from temperature changes.

As mentioned, changes in temperature are the biggest source of errors in density measurement. Since these errors are substantially avoided by the above described method, the resulting density measurement may be utilized to accurately validate the flow calibration factor. However, if desired, the temperature compensated density information may be further compensated for changes in material pressure. This is done by determining the ratio of density change to pressure change of the material and by multiplying this ratio by the difference in the measured line pressure and a preselected reference pressure. This gives a further compensation factor that may be applied to the density information to yield a density determination that is compensated both for changes in temperature and changes in pressure. This information may then be used as is in a validation of the flow calibration factor it may be further compensated for density changes inherent with changes in material composition. If this is desired, the temperature and pressure compensated density information may be further compensated for changes in material composition and then applied for use in determining an accurate flow calibration factor.

In accordance with a second possible exemplary embodiment of the invention, a density determination may be made that is compensated for temperature and/or pressure and/or material compensation by the steps of programming a multi dimensional look-up table which correlates information relating all possible operating temperatures, operating pressures and material compositions. The table may be then used to first provide temperature compensated density information. This is done by the steps of determining the instantaneous material temperature and density reading and entering this information into the look-up table which produces an output that represents the density reading compensated to a prior preselected reference temperature. In this manner, a plurality of density readings at different temperatures can be made, but each reading is temperature compensated to the preselected reference temperature. This provides a series of density readings equal to that which would have been obtained if made during a time interval when the measured temperature equals the preselected temperature. The temperature compensated density readings thus made, can then be used as desired for a flow calibration factor validation or can be further compensated in a similar manner using the look-up table for changes in pressure and material composition.

In summary, both of the above described exemplary embodiments of the invention enable density information to be obtained that is compensated to a preselected temperature even though the operating temperature of the process material continues to change while in use. This temperature compensated density information may if desired be further compensated in a similar manner for changes in pressure and in material composition. This reliable compensated density information maybe then used to provide a validation of the flow calibration factor of improved accuracy.

Aspects

One aspect of the invention includes, a method of validating the flow calibration factor of a Coriolis flowmeter adapted to process a material flow; said method comprising the steps of:

defining a reference density at a reference temperature of said material flow;

measuring a line density and line temperature of said material flow; and comparing said reference density to said line density when said line temperature corresponds to said reference temperature.

Preferably, the method further comprises said step of measuring comprises the further steps of:

defining upper and lower limits of values of said temperature compensated reference density;

determining whether each generated temperature compensated reference density is within said limits; and continuing said measurement when said temperature compensated reference density is within said limits.

Preferably, the method further comprises said steps of measuring further comprises the steps of:

measuring said line density only when said line temperature equals said reference temperature;

recording said temperature compensated reference density representing said density when said line temperature equals said reference temperature.

Preferably, the method further comprises said reference temperature is between the limits of variations of said line temperature.

Preferably, the method further comprises the step of generating an error signal upon the detection of a temperature compensated reference density exceeding said limits.

Preferably, the method further comprises the steps of:

successively measure the line pressure of said material flow;

determining a density/pressure compensation factor for said material flow;

compensating said temperature compensated reference density using said density/pressure compensation factor to derive a pressure and temperature compensated reference density; and using said pressure and temperature compensated reference density in determining said flow calibration factor of said Coriolis flowmeter.

Preferably, the method further comprises said density/pressure compensation factor is formed by the steps of:

determining the ratio of changes in density to changes in pressure;

determining in the pressure difference between said line pressure and said reference pressure; and multiplying said ratio by said pressure difference to obtain said pressure compensation factor.

Preferably, the method further comprises said limits further define upper and lower limits for variations in said pressure and temperature compensated reference density.

Preferably, the method further comprises the steps of:
successively measuring the material composition of said material flow;
determining a material composition compensation factor for the density of said material flow;
compensating said temperature compensated reference density using said material composition compensation factor to derive a material composition and pressure and temperature compensated reference density; and
using material composition and said pressure and said temperature compensated reference density in validating said flow calibration factor of said Coriolis flowmeter.

Preferably, the method further comprises said limits further define upper and lower limits for variations in said material composition and said pressure and temperature compensated reference density.

Preferably, the method further comprises the steps of:
forming a data structure containing density values of said material flow for a range of line temperatures and reference temperatures;
applying the line temperature and line density to said structure in response to each measurement;
and reading out said data structure to obtain a temperature compensated reference density for said reference temperature.

Preferably, the method further comprises said data structures contains information relating values of material pressure to said density values for a range of line temperatures and reference temperatures;
said method includes the further steps of:
applying the line temperature and line density and pressure to said structure in response to each measurement;
and reading out said data structure to obtain a pressure and temperature compensated reference density for said reference temperature.

Preferably, the method further comprises said data structure contains information relating values of material composition and material pressure to said density values for a range of line temperatures and reference temperatures;
said method includes the further steps of:
applying the material composition and line temperature and line density and pressure to said structure in response to each reading;
and reading out said data structure to obtain a material composition, pressure and temperature compensated reference density for said reference temperature.

Another aspect of the invention comprises a software product adapted to calibrate a Coriolis flowmeter, said soft product comprising:
a media configured to store instructions;
a processing system configured to read said instructions from said media;
said instructions configured to direct said processing system to execute the steps of:
defining a reference temperature of a material flow processed by said Coriolis flowmeter;
successively measuring the line density and line temperature of said material flow;
generating a compensated density for said reference temperature in response to each measurement; and
validating a flow calibration factor of said Coriolis flowmeter using said generated temperature compensated reference density.

Preferably, said media is configured to store instructions configured to direct said processing system to execute the further steps of:
measuring said line density only when said line temperature equals said reference temperature;
recording said temperature compensated reference density representing said density when said line temperature equals said reference temperature.

Preferably, said media is configured to store instructions configured to direct said processing system to execute the further steps of:
forming a data structure containing density values of said material flow for a range of line temperatures and reference temperatures;
applying the line temperature and line density to said structure in response to each reading;
and reading out said data structure to obtain a temperature compensated reference density for said reference temperature.

These and other advantages of the present invention will be apparent from the drawings and a reading of the detailed description thereof.

DESCRIPTION OF THE DRAWINGS

FIG. 4 illustrates typical variations of density with respect to time;

FIG. 5 indicated the conditions under which density readings are made;

FIG. 9-11 are flowcharts illustrating the steps used to determined compensated density information.

DETAILED DESCRIPTION

Figure 1:
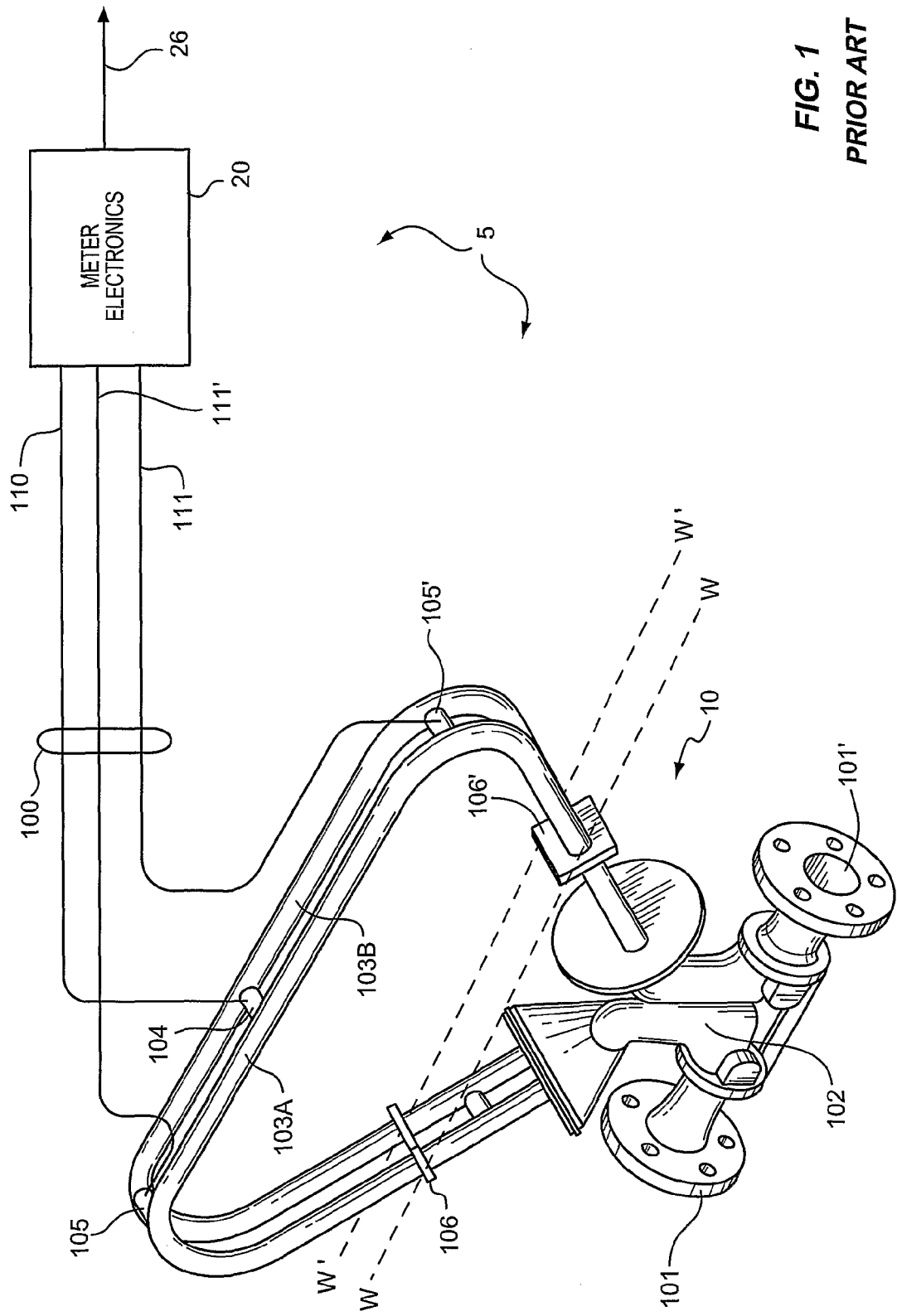
FIG. 1 is a Coriolis flow meter common in the prior art.

Coriolis Flowmeter in General—FIG. 1

FIG. 1 illustrates a Coriolis flowmeter 5 comprising a flowmeter assembly 10 and meter electronics 20. Meter electronics 20 is connected to meter assembly 10 via leads 100 to provide density, mass flow rate, volume flow rate, totalized mass flow and other information over path 26. It should be apparent to those skilled in the art that the present invention can be used by any type of Coriolis flowmeter regardless of the number of drivers or the number of pick-off sensors.

Flowmeter assembly 10 includes a pair of flanges 101 and 101', manifold 102 and flow tubes 103A and 103B. Connected to flow tubes 103A and 103B are driver 104 and pick-off sensors 105 and 105'. Brace bars 106 and 106' serve to define the axes W and W' about which each flow tube 103A and 103B oscillates.

When flowmeter assembly 10 is inserted into a pipeline system (not shown) which carries the material being measured, material enters flowmeter assembly 10 through flange 101, passes through manifold 102 where the material is directed to enter flow tubes 103A and 103B, flows through flow tubes 103A and 103B and back into manifold 102 where it exits meter assembly 10 through flange 101'.

Flow tubes 103A and 103B are selected and appropriately mounted to manifold 102 so as to have substantially the same mass distribution, moments of inertia, and elastic modules about bending axes W-W and W'-W' respectively. The flow tubes extend outwardly from the manifold in an essentially parallel fashion.

Flow tubes 103A-B are driven by driver 104 in opposite directions about their respective bending axes W and W' and at what is termed the first out of bending fold of the flowmeter. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 receives the right and left velocity signals appearing on leads 111 and 111', respectively. Meter electronics 20 produces the drive signal on lead 110 which causes driver 104 to oscillate flow tubes 103A and 103B. The present invention as described herein, can produce multiple drive signals from multiple drivers. Meter electronics 20 process left and right velocity signals to compute mass flow rate and provide the validation system of the present invention. Path 26 provides an input and an output means that allows meter electronics 20 to interface with an operator.

Figure 2:
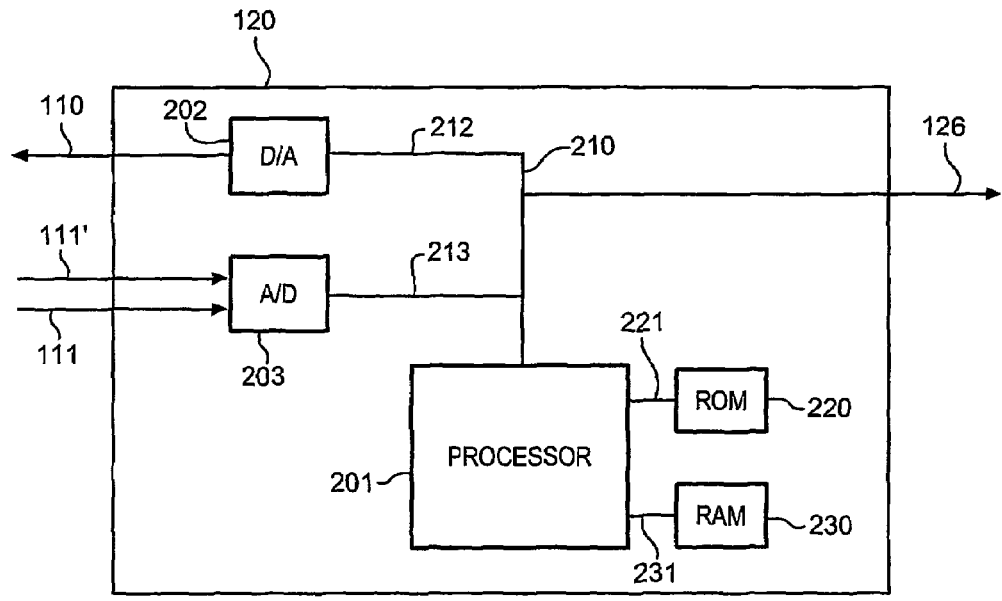
FIG. 2 is a block diagram of the meter electronics in the Coriolis flowmeter.

Meter Electronics 20 in General—FIG. 2

FIG. 2 illustrates a block diagram of the components of meter electronics 20 which perform the processes related to the present invention. Paths 111 and 111' transmit the left and right velocity signals from flowmeter assembly 10 to meter electronics 20. The velocity signals are received by analog to digital (A/D) converter 203 in meter electronic 20. A/D converter 203 converts the left and right velocity signals to digital signals usable by processor 201 and transmits the digital signals over path 213 to 1/0 bus 210. The digital signals are carried by I/O bus 210 to processor 201. Driver signals are transmitted over I/O bus 210 to path 212 which applies the signals to digital to analog (D/A) converter 202. The analog signals from D/A converter 202 are transmitted to driver 104 via path 110. Path 26 is connected to I/O bus 210 and carries signals to input and output means (not shown) which allow meter electronics 20 to receive data from and convey data to an operator.

Processor 201 reads instructions for performing the various functions of the flowmeter including but not limited to computing mass flow rate of a material, computing volume flow rate of a material, and computing density of a material from a Read Only Memory (ROM) 220 via path 221. The data as well as instructions for performing the various functions are stored in a Random Access Memory (RAM) 230. Processor 201 performs read and write operations in RAM memory 230 via path 231.

Figure 3:
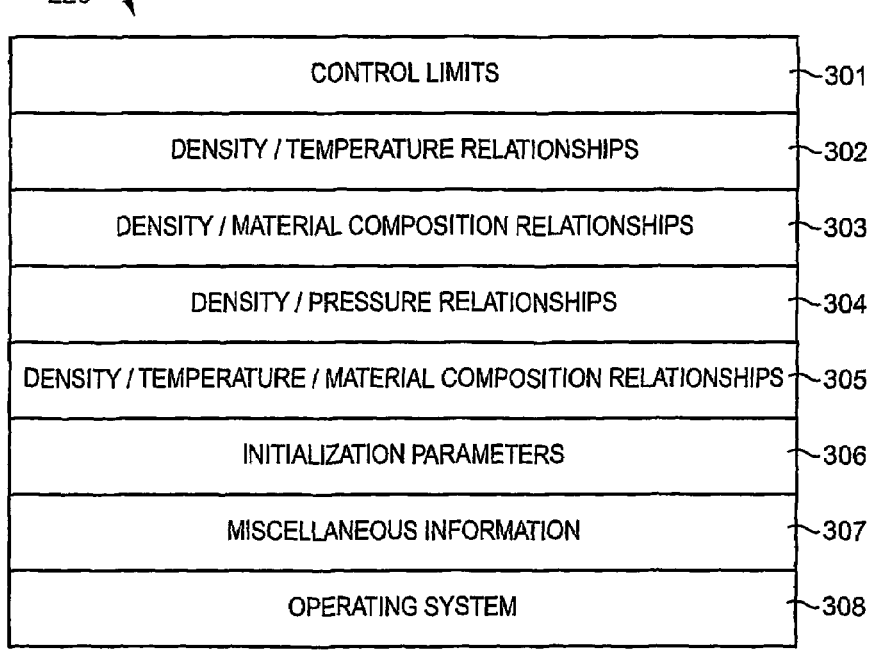
FIG. 3 discloses details of ROM 220.

Description of FIG. 3

ROM 220 is disclosed in further detail in FIG. 3 where it is shown to comprise a memory segment 301 adapted to store specified control limits; a memory section 302 which is adapted to store density/temperature relationships; a memory section 303 which is adapted to store density/material composition relationships; a memory section 304 which is adapted to store density/pressure relationships; a memory section 305 adapted to store density/temperature/material composition relationships; a memory section 306 adapted to store initialization parameters; a memory section 307 adapted to store miscellaneous information pertaining to the operation and calibration of the flowmeter; and a memory section 308 adapted to store an operating system and other software required for the operation of processor 201.

The Relationship between Density and Flow Calibration Factor

The period of oscillation is used to detect possible error conditions in the flow tube because of the relationship between the flow calibration factor of a flow tube and the measured density of a material flowing through the flow tube. The flow calibration factor (FCF) is equal to a first geometric constant ($G_1$) multiplied by Young's modulus of elasticity for the flow tube ($E_0$) and by the moment of inertia ($I_0$) of the flow tube. The density of a material flowing through a flow tube is calculated by multiplying the square of the period of oscillation of the flow tube ($P^2$) as the material flows through the tube by a first density constant ($C_1$) and then adding a second density constant ($C_2$) to the result. The first density constant (C) is determined by multiplying a second geometric constant ($G_2$) by Young's modulus of elasticity for the flow tube ($E_0$) and by the moment of inertia of the flow tube ($I_0$). Since the first geometric constant of the flow calibration factor and the second geometric constant of density are both multiplied by Young's modulus of elasticity for the flow tube and by the moment of inertia of the flow tube, the flow calibration factor and the first density constant are proportional.

A change in the first density constant ($C_1$) is typically not attributed to a change in the second geometric constant ($G_2$) which changes very little as the material and/or cross sectional properties of the flow tube change. Therefore, a change in the first density constant ($C_1$) is usually caused by a change in Young's modulus ($E_0$) or the moment of inertia in the flow tube ($I_0$). Since Young's modulus ($E_0$) and the moment of inertia ($I_0$) are also used to calculate the flow calibration factor (FCF), it can be assumed that a change in the first density constant ($C_1$) indicates a change in a flow calibration factor (FCF).

A change in the first density constant ($C_1$) can be detected from the measured density of a material. If the measured density of the material is inaccurate, the first and second density constants ($C_1$ and $C_2$) used to calculate the density must also be inaccurate. Since a period of oscillation of the flow tube as a material flows through the flow tube (P) is used to calculate the density of the material flowing through the flow tube, it is possible to use the period of oscillation (P) to detect a change in the first density constant ($C_1$) which in turn indicates a probable change in the flow calibration factor (FCF).

Description of FIG. 4

The density of the typical process material within a Coriolis flowmeter is not a constant and changes frequently with respect to time. The reason for this is that material density can change with variations in both temperature and pressure. Also, the density of a process material may change due to the composition of the material itself. This relationship is shown on FIG. 4 for graph 400 wherein the measured density of the material is represented by the vertical axis 401; the horizontal axis 402 represents time. The solid line 403 is sinusoidal and essentially of a near constant amplitude and represents one possible variation in density with respect to time. The dashed line 404 also sinusoidal and has an amplitude of measured density that increases with time. This compares with solid line 403 which has a near constant amplitude with respect to variations in time. Line 403 represents acceptable variations in density. Line 404 has amplitude variations that increases significantly with respect to time. This is undesirable and may be due to temperature changes or buildup of material within the flow tubes of the flowmeter or may be due to other undesirable features such as corrosion or erosion of the interior of the flow tubes.

Density variations portrayed by graph 404 are undesirable and must be must be compensated for in the processing and use of the measured density information. This is necessary to provide density information that may be subsequently used to validate the flow calibration factor used by the flow meter in generating accurate flow information.

Description of FIG. 5

FIG. 5 is a graph showing how the measured temperature of the process material can vary with time. Temperature is represented by the vertical axis 501; time is shown along axis 502. The solid line 503 shows that the measured temperature can vary randomly with time. The crossings of graph 503 across the axis 502 are portrayed by dots 504.

In accordance with the first exemplary embodiment of the present invention, the measured line density of FIG. 4 is temperature compensated by measuring the line density only when the temperature line 503 of FIG. 5 crosses axis 502 at locations 504. By measuring the line density in this manner, the variations in density due to temperature changes are eliminated since all density measurements are taken at the reference temperature of 50° C. Thus, all variations in density measurements are eliminated by the steps of: specifying a material temperature to which the density is to be compensated, measuring the line density only when the measured temperature equals the reference temperature, recording the line density information in memory to obtain a succession of temperature compensated density measurements free of variations in temperature since they are all taken at the reference temperature specified by the user.

As portrayed in FIG. 5, the temperature of the process material varies between 40° C. and 60° C. with the reference temperature being 50° C. and being on the axis 502. By measuring the density only at the times represented by the dots 504, a succession of temperature compensated density measurements is obtained at the constant temperature of 50° C. This succession of temperature compensated density measurements is therefore free of the influence of temperature variations.

Figure 6:
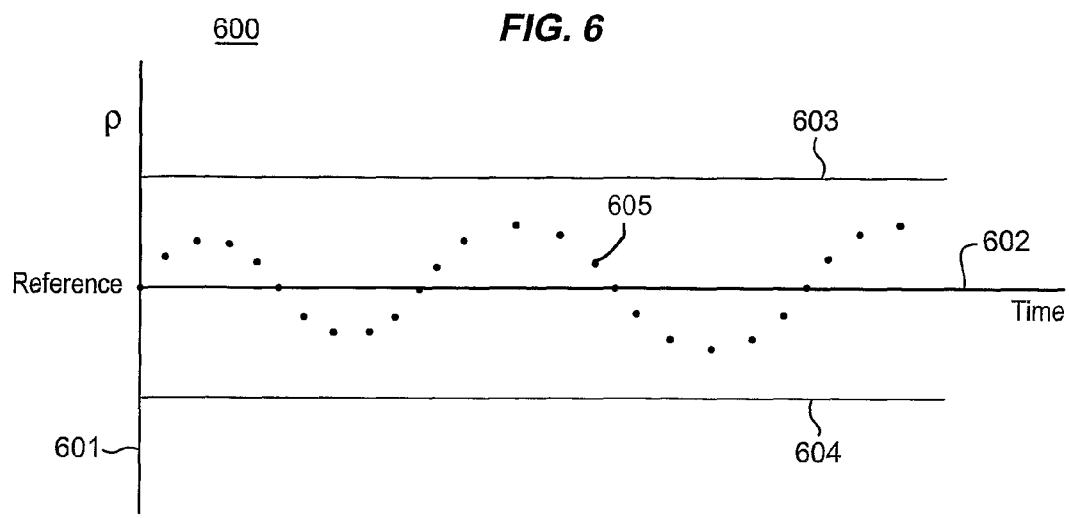
FIG. 6 illustrates typical variations in reference density with respect to time in accordance with the present invention.

Description of FIG. 6

Graph 600 in FIG. 6 shows density ρ on the vertical axis 601 and time on the horizontal axis 602. Waveform 605 shows density measurements resulting from the measurement of the line density only when the line temperature equals the reference temperature of 50° C. Lines 603 and 604 on FIG. 6 represent the upper and lower limits of acceptability for the density measurement. FIG. 6 shows that the waveform 605 is well within the confines of the upper and lower limits 603 and 604. This tight control of the density measurements using the method of the present invention shows that the variations in density measurements are improved over the results shown in FIG. 4 which shows the density measurements obtained when measurements are made at random temperatures.

The time axes shown on FIGS. 4, 5 and 6 may represent minutes, hours or days since density and flow calibration factor changes are relatively slow changing phenomena.

Figure 7:
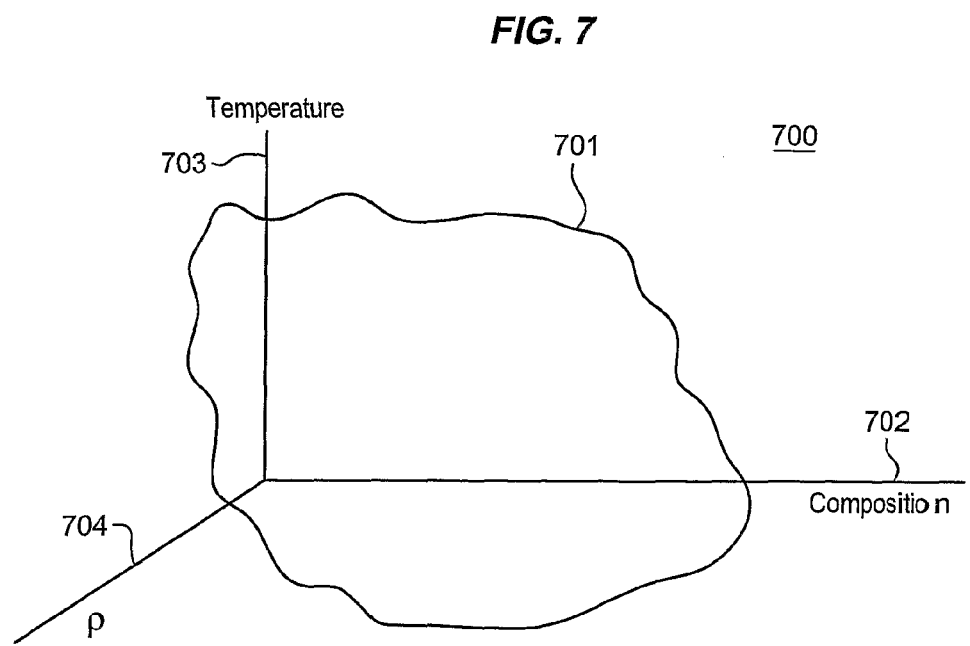
FIG. 7 illustrates a data surface relating density, temperature, and material composition.

Description of FIG. 7

In accordance with a second possible exemplary embodiment of the invention, FIG. 7 illustrates element 701 which is a symbolic surface representing density/temperature/concentration relationships between density, temperature and material composition. The three-dimensional graph of 700 represents material composition along X axis 702, temperature along Y axis 703 and density ρ along Z axis 704. Surface 701 represents the locations required to portray all combinations of density, temperature and material composition used in the operation of the present invention. Data surfaces are well known in the art and are shown for example in publication WO 01/67052A1 of 13 Sep. 2001. This publication shows the correlation of the parameters of density, temperature and pressure.

Surface 701 may also be embodied by a three-dimensional table lookup stored in memory 220 of processor 201 shown on FIG. 2. In accordance with well known table lookup procedures, a line density reading made at 60° C. as shown on FIG. 5 may be compensated to the reference temperature of 50° C. by the use of a lookup table representing combinations of temperature and density. For example, a line density reading made at 60° C. could be compensated to the reference temperature of 50° C. by addressing the memory containing the table lookup with parameters representing the density reading obtained at 60° C. and the parameter of 50° C. representing the desired reference temperature. The addressing of the table lookup memory with these parameters would produce an output indicating the measured line density reading temperature compensated to the reference temperature of 50° C. In the same manner, a three-dimensional portrayal of the parameters of temperature, material composition and density could be obtained using a three-dimensional table lookup by addressing the memory with the measured line density at 60° C., the reference temperature of 50° C. to which the measured density is to be compensated, as well as further addressing the memory with the parameters representing the material composition. The three-dimensional table lookup memory outputs information representing a reference density that is temperature compensated for the reference temperature of 50° C. and is further compensated for variations in the material composition. The resultant density information is devoid of the influences of temperature variations as shown in FIG. 6. Density information could also be compensated for pressure changes in the same manner by the use of look-up tables.

Figure 8:
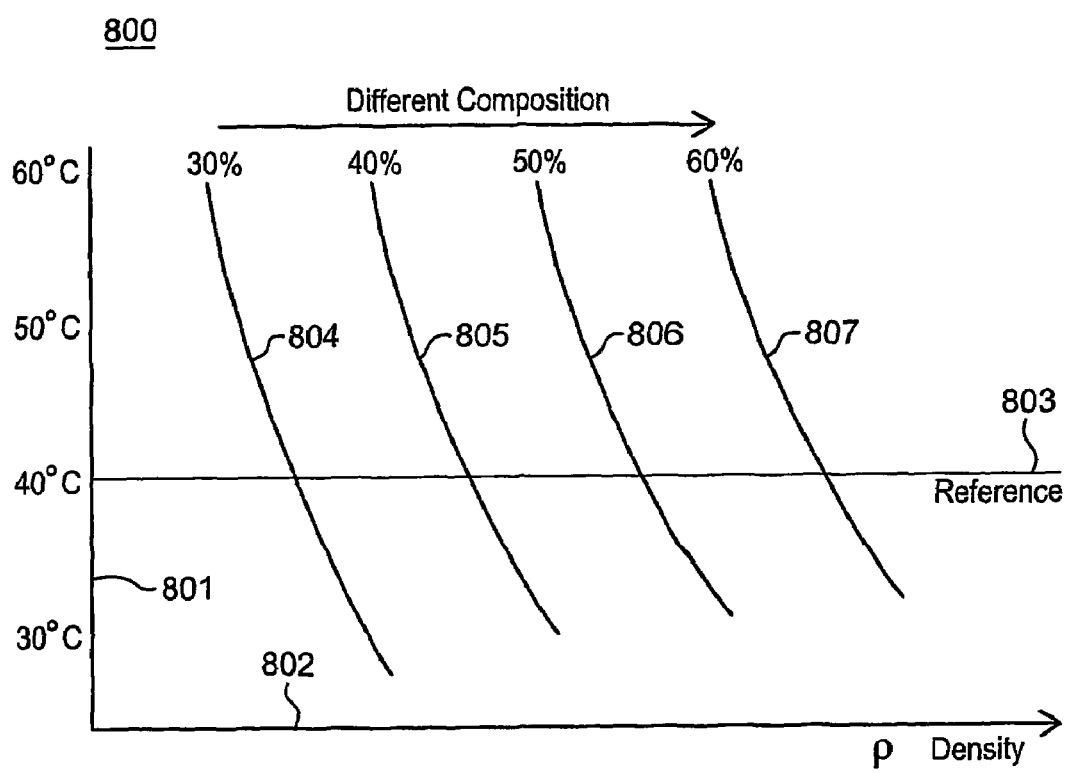
FIG. 8 illustrates variations in density with respect to changes in material composition.

Description of FIG. 8

Graph 800 of FIG. 8 shows how density, temperature and material composition are interrelated. Density is shown along axis 802. The temperature is represented by the Y axis 801 and the lines 804, 805, 806 and 807 represent different percentage of material compositions. Line 804 represents 30%, line 805 represents 40%, line 806 represents 50% and line 807 represents 60%. For a given percent of material composition such as, for example, 30%, the density temperature relationships are portrayed by line 804. Similarly, lines 805, 806 and 807 represent possible density/temperature combinations for material percentages of 40%, 50% and 60%, respectively. Line 803 represents a reference density temperature compensated to 50° C.

Description of FIG. 9

FIG. 9 discloses a process 900 having steps 901-905 which initialize the flowmeter in preparation for a determination of a reference density ρ as well as for a reference temperature T and reference pressure P. These three parameters are used in determining the reference conditions permitting a more accurate validation of the flow calibration factor FCF. Process 900 begins with step 901 which initializes the meter installation. This includes the meter physical installation as well as setup calibrations that determine the accuracy, linearity and zero flow readings of the meter. Step 902 performs the function of trending parameters of the material flow. This includes readings for measured density, measured temperature and measured pressure of the material flow. The step of trending entails the recording of a number of successive measurements of density, temperature and pressure followed by their processing to derive an average or a mean. This is done to determine the values of density, temperature and pressure to be used as reference values for subsequent processing steps.

In step 903, the user supplies the upper and lower process control limits to be used for the density, temperature and pressure parameters. These limits enable the processing apparatus to identify subsequent measurements that exceed the limits and require the user to be notified. Step 904 records the temperature to be used as the reference temperature in subsequent process steps. Step 905 records the value of the reference pressure to be used in the subsequently processing steps. Following step 905, the process continues on FIG. 10 in accordance with a first possible exemplary embodiment of the invention. Alternatively, the process continues on FIG. 11 in accordance with a second exemplary embodiment of the invention.

Description of the Process of a First Possible Exemplary Embodiment—FIG. 10

In step 1001 of process 1000, every time the line temperature of the process material corresponds to the reference temperature of 50° C., the line density is measured and is compared to the reference density value. The line density is recorded and saved for subsequent use. Step 1001 also performs the same function for the pressure of the process material. This gives a temperature compensated reference pressure.

Step 1002 determines the ratio of changes in density $\Delta\rho$ with respect to changes in pressure $\Delta P$. This is obtained from consecutive measurements of density and pressure at different values.

Step 1003 determines a reference density compensated for both temperature and pressure by solving the expression Reference density compensated at (T, P)=Reference density $$(T) \times \frac{\Delta\rho}{\Delta P}(P_{line} - P_{reference}).$$

This expression states that a reference density compensated for both a reference temperature and reference pressure is determined by taking the temperature compensated reference density and multiplying it by the ratio of $$\frac{\Delta\rho}{\Delta P}$$

which, in turn, is multiplied by the difference in the measured line pressure temperature ($P_{line}$) and the reference pressure ($P_{reference}$). This expression determines reference density compensated for both temperature and pressure. For most non-gas process materials, the resulting change in the reference density for pressure variance is small and the expression $$\frac{\Delta\rho}{\Delta P}(P_{line} - P_{reference})$$

will be close to 1. The resultant change in the reference density compensated for pressure will be small. The situation is different for the processing of gases where the reference density compensated for pressure will be changed a meaningful amount.

The output of step 1003 is a density signal that is compensated for both a reference temperature and a reference pressure. This signal is applied to step 1004 which compares the value of the temperature and pressure compensated density against the upper and lower control limits selected by the user in step 903.

The output of step 1004 is applied to step 1007 which validates the flow calibration factor FCF. The output of step 1004 is also applied to step 1005 which states that if the compensated density is outside of the control limits, it may be that the excessive deviation is due to undesirable factors such as corrosion or erosion or product buildup. Step 1006 transmits a signal to the user indicating that the compensated density is outside of the limits selected by the user.

Description of the Second Possible Preferred Exemplary Embodiment—FIG. 11

Step 1101 receives from the steps of FIG. 9 the measured value of density, temperature and pressure, the determined upper and lower control limits, as well as the reference temperature and pressure.

As priorly described for FIG. 2, processor 201 of meter electronics 120 and its ROM memory 220 are programmed with table lookup information as described for FIG. 7. This information includes three-dimensional data correlating density, temperature, pressure and material composition.

Step 1101 repeatedly measures the line density. Each line density measurement is processed by the table lookup information of FIG. 5 which compensates the measured line density for the difference between the measured temperature value and the reference temperature value. By means of the table lookup stored in memory, a density for each measurement is obtained that represents the measured line density value compensated for the temperature of 50° C. This temperature compensated density is stored in RAM memory 230 by step 1102. The output of step 1102 is applied to step 1103.

Step 1103 measures the line pressure and the preprogrammed pressure relationship stored in the table lookup facilities of FIG. 7 to determine line density compensated for both temperature and pressure.

The temperature and pressure compensated density information of step 1103 is applied to the input of step 1104 which compensates the received compensated density information for changes in material composition. This compensation is also made by the table lookup facilities which relates to various materials processed by the flowmeter to values of density, temperature and pressure. The output of step 1104 is then applied to step 1105 which checks the information it receives against the specified control limits. The output of step 1105 is applied to step 1108 which validates the flow calibration factor. The output of step 1105 is also applied to step 1106 which determines whether the received density readings are within or without the control limits and if the limits are exceeded, it sends a signal to step 1107 which notifies the user that the processed density information is beyond the control limits specified by the user. The user may then take whatever action, if any, deemed appropriate.

While specific embodiments of this invention have been disclosed above, it is expected that those skilled in the art can and will design alternative embodiments of this invention that fall within the scopes of the following claims either literally or through the Doctrine of Equivalents.

We claim:

1. A method of validating a calibration factor for a Coriolis flowmeter adapted to process a material flow, comprising the steps of:
    defining at least one density at a reference temperature of said material flow;
    determining a compensated line density and a line temperature of said material flow, wherein the step of determining the compensated line density includes temperature compensating a line density by determining the line density when said line temperature corresponds to said reference temperature; and
    detecting an error condition, wherein the step of detecting an error condition includes comparing said compensated line density to the at least one density.

2. The method of claim 1 wherein said at least one density includes upper and lower limits for said compensated line density.

3. The method of claim 2 which said upper and lower limits are determined by determining a reference density for said material flow at said reference temperature and selecting said upper and lower limits so that the reference density is between said upper and lower limits.

4. The method of claim 1 wherein said at least one density is a reference density for said material flow that is determined at the reference temperature.

5. The method of claim 1 characterised in that said method further comprises the steps of:
    measuring the line pressure of said material flow;
    determining a pressure compensation factor for said material flow; and
    wherein the step of determining the compensated line density includes the step of compensating said temperature compensated line density using said pressure compensation factor.

6. The method of claim 5 wherein said pressure compensation factor is formed by the steps of
    determining the ratio of changes in density to changes in pressure;
    determining a pressure difference between said line pressure and a reference pressure; and
    multiplying said ratio by said pressure difference to obtain said pressure compensation factor.

7. The method of claim 5 characterisedcharacterised in that said method further comprises the steps of:
    measuring the material composition of said material flow;
    determining a material composition compensation factor for said material flow; and
    wherein the step of determining the compensated line density includes the step of compensating said temperature and pressure compensated line density using said material composition compensation factor.

8. The method of claim 1 characterised in that said method further comprises the steps of
    measuring the material composition of said material flow;
    determining a material composition compensation factor for said material flow; and
    wherein the step of determining the compensated line density includes the step of compensating said temperature compensated line density using said material composition compensation factor.

9. The method of claim 8 characterised in that said method further comprises the steps of:
    measuring The line pressure of said material flow;
    determining a pressure compensation factor for said material flow; and
    wherein The step of determining the compensated line density includes the step of compensating said material composition and temperature compensated line density using said pressure compensation factor.

10. A computer program product comprising computer usable medium including executable code for executing a process adapted to calibrate a Coriolis flowmeter comprising the steps of:
    defining at least one density at a reference temperature of a material flow processed by said Coriolis flowmeter;
    determining a compensated line density and line temperature of said material flow, wherein the step of determining the compensated line density includes temperature compensating a line density by determining the line density when said line temperature corresponds to said reference temperature; and
    detecting an error condition, wherein the step of detecting error condition includes comparing said compensated line density to the at least one density.

11. The computer program product according to claim 10 wherein said at least one density includes upper and lower limits for said compensated line density.

12. The computer program product according to claim 11 wherein said upper and lower limits are determined by determining a reference density for said material flow at said reference temperature and selecting said upper and lower limits so that the reference density is between said upper and lower limits.

13. The computer program product according to 10 wherein said at least one density is a reference density for said material flow that is determined at the reference temperature.

14. The computer program product according to claim 10 characterised in that said method further comprises the steps of:
    measuring the line pressure of said material flow;
    determining a pressure compensation factor for said material flow; and
    wherein the step of determining did compensated line density includes the step of compensating said temperature compensated line density using said pressure compensation factor.

15. The computer program product according to claim 14 wherein said pressure compensation factor is formed by the steps of:
    determining the ratio of changes in density to changes in pressure;
    determining a pressure difference between said line pressure and a reference pressure; and
    multiplying said ratio by said pressure difference to obtain said pressure compensation factor.

16. The computer program product according to claim 14 characterised in that said method further comprises the steps of:
    measuring the material composition of said material flow;
    determining a material composition compensation factor for said material flow; and
    wherein die step of determining the compensated line density includes the step of compensating said temperature and pressure compensated line density using said material composition compensation factor.

17. The computer program product according to claim 10 characterised in that said method further comprises the steps of:
measuring the material composition of said material flow;
determining a material composition compensation factor for said material flow; and
wherein the step of determining the compensated line density includes the step of compensating said temperature compensated line density said material composition compensation factor.

18. The computer program product according to claim 17 characterised in that said method further comprises the steps of:
measuring the line pressure of said material flow;
determining a pressure compensation factor for said material flow; and
wherein the step of determining the compensated line density includes the step of compensating said material composition and temperature compensated line density using said pressure compensation factor to derive the compensated line density that has been compensated for material composition, pressure, and temperature.

19. A method of validating a calibration factor for a Coriolis flowmeter adapted to process a material flow, comprising the steps of:
defining at least one density at a reference temperature of said material flow;
determining a compensated line density and a line temperature of said material flow, wherein the step of determining the compensated line density includes temperature compensating a line density by determining the line density when said line temperature and said reference temperature differ and compensating the determined line density for the difference between the line temperature and the reference temperature; and
detecting an error condition, wherein the step of detecting an error condition includes comparing said compensated line density to the at least one density.

20. The method of claim 19 wherein said at least one density includes upper and lower limits for said compensated line density.

21. The method of claim 20 wherein said upper and lower limits are determined by determining a reference density for said material flow at said reference temperature and selecting said upper and lower limits so that the reference density is between said upper and lower limits.

22. The method of claim 19 wherein said at least one density is a reference density for said material flow that is determined at the reference temperature.

23. The method of claim 19 characterised in that said method further comprises the steps of:
measuring the line pressure of said material flow;
determining a pressure compensation factor for said material flow; and
wherein the step of determining the compensated line density includes the step of compensating said temperature compensated line density using said pressure compensation factor.

24. The method of claim 23 wherein said pressure compensation factor is formed by the steps of:
determining the ratio of changes in density to changes in pressure;
determining a pressure difference between said line pressure and a reference pressure; and
multiplying said ratio by said pressure difference to obtain said pressure compensation factor.

25. The method of claim 23 characterised in that said method further comprises the steps of:
measuring the material composition of said material flow;
determining a material composition compensation factor for said material flow; and
wherein the step of determining the compensated line density includes the step of compensating said temperature and pressure compensated line density using said material composition compensation factor.

26. The method of claim 19 characterised in that said method further comprises the steps of:
measuring the material composition of said material flow;
determining a material composition compensation factor for said material flow; and
wherein the step of determining the compensated line density includes the step of compensating said temperature compensated line density using said material composition compensation factor.

27. The method of claim 26 characterised in that said method further comprises the steps of:
measuring the line pressure of said material flow;
determining a pressure compensation factor for said material flow; and
wherein the step of determining the compensated line density includes the step of compensating said material composition and temperature compensated line density using said pressure compensation factor.

28. The method of claim 19 further comprising the steps of:
providing a data structure including information relating density values and a range of temperatures; and
where the step of determining the compensated line density includes applying the line density determined when said line temperature and said reference temperature differ to said data structure.

29. The method of claim 19 further comprising the steps of:
providing a data structure including information relating material pressure values, density values, and a range of temperatures;
determining a line pressure of the material flow; and
where the step of determining the compensated line density includes applying the line density determined when said line temperature and
said reference temperature differ, said determined line temperature, and said determined line pressure to said data structure.

30. The method of claim 19 further comprising the steps of:
providing a data structure including information relating material composition, density values, and a range of temperatures;
determining the material composition of the material flow; and
where the step of determining the compensated line density includes applying the line density determined when said line temperature and said reference temperature differ, said determined line temperature, and said determined material composition to said data structure.

31. A computer program product comprising computer usable medium including executable code for executing a process adapted to calibrate a Coriolis flowmeter comprising the steps of:
defining at least one density at a reference temperature of a material flow;
determining a compensated line density and line temperature of said material flow, wherein the step of determining the compensated line density includes temperature compensating a line density by determining the line density when said line temperature and said reference temperature differ and compensating the determined line density for the difference between the line temperature and the reference temperature; and detecting an error condition, wherein the step of detecting an error condition includes comparing said compensated line density to the at least one density.

32. The computer program product according to claim 31 wherein said at least one density includes upper and lower limits for said compensated line density.

33. The computer program product according to claim 32 wherein said upper and lower limits of values for said compensated line density are determined by determining a reference density for said material flow at said reference temperature and selecting said upper and lower limits so that the reference density is between said upper and lower limits.

34. The computer program product according to claim 31 wherein said at least one density is a reference density for said material flow that is determined at the reference temperature.

35. The computer program product according to claim 31 characterised in that said method further comprises the steps of:

measuring the line pressure of said material flow;

determining a pressure compensation factor for said material flow; and wherein the step of determining the compensated line density includes the step of compensating said temperature compensated line density using said pressure compensation factor.

36. The computer program product according to claim 35 wherein said pressure compensation factor is formed by the steps of:

determining the ratio of changes in density to changes in pressure;

determining a pressure difference between said line pressure and a reference pressure; and multiplying said ratio by said pressure difference to obtain said pressure compensation factor.

37. The computer program product according to claim 35 characterised in that said method Thither comprises the steps of:

measuring the material composition of said material flow;

determining a material composition compensation factor for said material flow; and wherein the step of determining the compensated line density includes the step of compensating said temperature and pressure compensated line density using said material composition compensation factor.

38. The computer program product according to claim 31 characterised in that said method Thither comprises the steps of:

measuring the material composition of said material flow;

determining a material composition compensation factor for said material flow; and wherein the step of determining the compensated line density includes the step of compensating said temperature compensated line density said material composition compensation factor.

39. The computer program product according to claim 38 characterised in that said method further comprises the steps of:

measuring the line pressure of said material flow;

determining a pressure compensation factor for said material flow; and wherein the step of determining the compensated line density includes the step of compensating said material composition and temperature compensated line density using said pressure compensation factor to derive the compensated line density that has been compensated for material composition, pressure, and temperature.

40. The computer program product according to claim 31 characterised in that said method further comprises the steps of:

providing a data structure including information relating density values and a range of temperatures; and where the step of determining the compensated line density includes applying the line density determined when said line temperature and said reference temperature differ to said data structure.

41. The computer program product according to claim 31 characterised in that said method further comprises the steps of:

providing a data structure including information relating material pressure values, density values, and a range of temperatures;

determining a line pressure of the material flow; and where the step of determining the compensated line density includes applying the line density determined when said line temperature and said reference temperature differ, said determined line temperature, and said determined line pressure to said data structure.

42. The computer program product according to claim 31 characterised in that said method further comprises the steps of:

providing a data structure including information relating material composition, density values, and a range of temperatures;

determining the material composition of the material flow; and where the step of determining the compensated line density includes applying the line density determined when said line temperature and said reference temperature differ, said determined line temperature, and said determined material composition to said data structure.

* * * * *

UNITED STATES PATENT AND TRADEMARK OFFICE
CERTIFICATE OF CORRECTION

| | | |
|---|---|---|
| PATENT NO. | : 7,614,273 B2 | Page 1 of 1 |
| APPLICATION NO. | : 10/570941 | |
| DATED | : November 10, 2009 | |
| INVENTOR(S) | : Andrew Timothy Patten et al. | |

It is certified that error appears in the above-identified patent and that said Letters Patent is hereby corrected as shown below:

Column 13, line 27, claim number 3, replace "which" with --wherein--.

Column 14, line 27, insert --an-- prior to "error"; line 38, claim number 13, insert --claim-- prior to "10"; line 47, replace "did" with --the--; line 66, replace "die" with --the--.

Column 17, lines 41 and 51, each occurrence of "Thither" should read --further--.

Signed and Sealed this
Twenty-second Day of February, 2011

David J. Kappos
*Director of the United States Patent and Trademark Office*